United States Patent
Aoyama et al.

(10) Patent No.: US 8,328,927 B2
(45) Date of Patent: Dec. 11, 2012

(54) WATER-BASED INK FOR INK JET RECORDING

(75) Inventors: Michiko Aoyama, Nagoya (JP); Narumi Koga, Nagoya (JP); Shunichi Higashiyama, Yokkaichi (JP); Masashi Tsuda, Ichinomiya (JP); Hiromitsu Sago, Tokai (JP); Kazuma Goto, Nagoya (JP); Akihiko Taniguchi, Kakamigahara (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 0 days.

(21) Appl. No.: 13/014,534

(22) Filed: Jan. 26, 2011

(65) Prior Publication Data

US 2011/0187799 A1    Aug. 4, 2011

(30) Foreign Application Priority Data

Jan. 29, 2010  (JP) .................................. 2010-018137
Jan. 29, 2010  (JP) .................................. 2010-018138
Jan. 29, 2010  (JP) .................................. 2010-018139

(51) Int. Cl.
C09D 11/02    (2006.01)

(52) U.S. Cl. ..................... 106/31.6; 106/31.64; 106/31.9

(58) Field of Classification Search ................ 106/31.6, 106/31.64
See application file for complete search history.

(56) References Cited

U.S. PATENT DOCUMENTS

| | | | |
|---|---|---|---|
| 6,153,001 A | 11/2000 | Suzuki et al. | |
| 6,383,274 B1 | 5/2002 | Lin | |
| 6,644,798 B2 * | 11/2003 | Katsuragi et al. | 347/100 |
| 6,899,754 B2 * | 5/2005 | Yeh et al. | 106/31.6 |
| 2001/0045975 A1 | 11/2001 | Katsuragi et al. | |
| 2002/0002930 A1 | 1/2002 | Yamashita et al. | |
| 2002/0059883 A1 | 5/2002 | Takada et al. | |
| 2002/0158951 A1 | 10/2002 | Tyvoll | |
| 2003/0107632 A1 | 6/2003 | Arita et al. | |
| 2004/0119801 A1 | 6/2004 | Suzuki et al. | |
| 2004/0257420 A1 | 12/2004 | Ichizawa et al. | |
| 2005/0065235 A1 | 3/2005 | Bauer | |
| 2005/0274281 A1 | 12/2005 | Jackson | |
| 2006/0240259 A1 | 10/2006 | Toyoda et al. | |
| 2007/0100023 A1 | 5/2007 | Burns et al. | |
| 2007/0100024 A1 | 5/2007 | Gu et al. | |
| 2008/0241398 A1 | 10/2008 | Kato et al. | |
| 2008/0280042 A1 * | 11/2008 | Yanagimachi et al. | 427/256 |
| 2009/0025605 A1 | 1/2009 | Ishimaru et al. | |
| 2011/0187770 A1 | 8/2011 | Aoyama et al. | |

FOREIGN PATENT DOCUMENTS

EP    1616915 A1    1/2006

(Continued)

OTHER PUBLICATIONS

EP Extended Search Report dtd Apr. 28, 2011, EP Appln. 11250085.5.

(Continued)

*Primary Examiner* — Melvin C Mayes
*Assistant Examiner* — Veronica F Faison
(74) *Attorney, Agent, or Firm* — Banner & Witcoff, Ltd.

(57) ABSTRACT

A water-based ink for ink jet recording, containing: a coloring agent; water; and a water-soluble organic solvent. The coloring agent contains a phosphate group-modified self-dispersing pigment. The water-based ink further contains at least one selected from the group consisting of boric acid, diglycolic acid, and a chelating agent.

15 Claims, 2 Drawing Sheets

FOREIGN PATENT DOCUMENTS

| | | |
|---|---|---|
| JP | 11-181341 | 7/1999 |
| JP | 11-228898 | 8/1999 |
| JP | 2000-313830 | 11/2000 |
| JP | 2001-187852 | 7/2001 |
| JP | 2001-294791 | 10/2001 |
| JP | 2002-317132 A | 10/2002 |
| JP | 2003-049106 | 2/2003 |
| JP | 2003-096355 | 4/2003 |
| JP | 2003-268274 | 9/2003 |
| JP | 2005-162898 A | 6/2005 |
| JP | 2006-008909 | 1/2006 |
| JP | 2006-291176 A | 10/2006 |
| JP | 2006-299348 A | 11/2006 |
| JP | 2007-505189 | 3/2007 |
| JP | 2007-119551 | 5/2007 |
| JP | 2008-502790 A | 1/2008 |
| JP | 2008-246821 | 10/2008 |
| JP | 2008-265059 | 11/2008 |
| JP | 2008-265104 | 11/2008 |
| JP | 2008-265121 | 11/2008 |
| JP | 2009-052018 A | 3/2009 |
| JP | 2009-515007 | 4/2009 |
| JP | 2011-157426 A | 8/2011 |
| JP | 2011-157427 A | 8/2011 |

OTHER PUBLICATIONS

Office Action for corresponding Japanese Patent Application No. 2010-018137 dated Jul. 11, 2012.
Office Action for corresponding Japanese Patent Application No. 2010-018138 dated Jul. 11, 2012.
Office Action for corresponding Japanese Patent Application No. 2010-018139 dated Jul. 11, 2012.
Office Action for Japanese Patent Application No. 2010-018140 dated Jul. 11, 2012.
Office Action for Japanese Patent Application No. 2010-018141 dated Jul. 11, 2012.

* cited by examiner

WATER-BASED INK FOR INK JET RECORDING

CROSS-REFERENCE TO RELATED APPLICATION

This application claims priority from Japanese Patent Application Nos. 2010-018137, 2010-018138, and 2010-018139 filed on Jan. 29, 2010. The entire subject matter of the Japanese Patent Applications is incorporated herein by reference.

BACKGROUND

There is a case that a self-dispersing pigment is used in a water-based ink for ink jet recording. Since the self-dispersing pigment does not need to use in combination with a polymer pigment dispersant, it can prevent an increase in viscosity of the water-based ink and the water-based ink is superior in ejection stability and storing stability. The self-dispersing pigment can be obtained by treating a pigment to bind with at least one type of hydrophilic group such as a phosphate group, a carboxylic group, or a sulfonate group or a salt thereof. A self-dispersing pigment obtained by treating a pigment specifically by a phosphate group among these hydrophilic groups (hereinafter, also referred to as "phosphate group-modified self-dispersing pigment") can obtain a high optical density (OD) as compared with a self-dispersing pigment obtained by treating a pigment by a carboxylic group or a sulfonate group.

On the other hand, the water-based ink using the self-dispersing pigment obtained by treating a pigment by a phosphate group has a problem in that its redispersibility is not favorable. "Redispersibility" is solubility and dispersibility of a solid substance generated by evaporation of a water-based ink to dryness in the case where the solid substance re-contacts with a water-based ink. When the water-based ink is unfavorable in redispersibility, there is a problem in ejection stability in the case where the water-based ink is evaporated to dryness in an ink flowing path or in proximity to the nozzle of an ink-jet head. There is a demand for the water-based ink for ink jet recording using the phosphate group-modified self-dispersing pigment to further improve an optical density (OD).

SUMMARY

A water-based ink for ink jet recording comprises: a coloring agent; water; and a water-soluble organic solvent. The coloring agent comprises a phosphate group-modified self-dispersing pigment. The water-based ink further comprises at least one selected from the group consisting of boric acid, diglycolic acid, and a chelating agent.

An ink cartridge comprises the water-based ink for ink jet recording. As a body of the ink cartridge, a conventionally known body may be used, for example.

An ink-jet recording method comprises performing recording on a recording medium by ejecting the water-based ink for ink jet recording using an ink-jet technique.

An ink-jet recording apparatus comprises: an ink storing portion; and an ink ejection unit. The ink ejection unit ejects an ink stored in the ink storing portion. The water-based ink for ink jet recording is stored in the ink storing portion.

A method for improving redispersibility of a water-based ink for ink jet recording that comprises phosphate group-modified self-dispersing pigment, comprises: adding at least one selected from the group consisting of boric acid, diglycolic acid, and a chelating agent to the water-based ink.

A method for improving an optical density of a recorded object obtained by performing recording using a water-based ink for ink jet recording that comprises a phosphate group-modified self-dispersing pigment, comprises: adding at least one selected from the group consisting of boric acid, diglycolic acid, and a chelating agent to the water-based ink.

DETAILED DESCRIPTION

The water-based ink for ink jet recording (hereinafter, also referred to as a "water-based ink" or an "ink") is explained. The water-based ink contains a coloring agent, water, and a water-soluble organic solvent. As mentioned above, the coloring agent contains the phosphate group-modified self-dispersing pigment. As the phosphate group-modified self-dispersing pigment, one obtained by treating a pigment by the method described in JP 2009-515007 A may be used. As the phosphate group-modified self-dispersing pigment, a commercially available product may be used, for example. The water-based ink may or may not contain a polymer pigment dispersant. In the case where the water-based ink contains a polymer pigment dispersant, the amount of the polymer pigment dispersant to be contained may be an amount by which a viscosity of the water-based ink is not influenced. Since the water-based ink contains a self-dispersing pigment, the water-based ink does not have a problem in viscosity increase caused by a polymer pigment dispersant and may be superior in ejection stability and storing stability.

Examples of a pigment that may be used as a raw material of the self-dispersing pigment include carbon black, an inorganic pigment, and an organic pigment. Examples of the carbon black include furnace black, lamp black, acetylene black, and channel black. Examples of the inorganic pigment include inorganic pigments of titanium oxide, iron oxide, and carbon black. Examples of the organic pigment include: azo pigments such as azo lake, an insoluble azo pigment, a condensed azo pigment, and a chelate azo pigment; polycyclic pigments such as a phthalocyanine pigment, a perylene pigment, a perinone pigment, an anthraquinone pigment, a quinacridone pigment, a dioxazine pigment, a thioindigo pigment, an isoindolinone pigment, and a quinophthalone pigment; a dye lake pigment such as a basic dye lake pigment and an acidic dye lake pigment; a nitro pigment; a nitroso pigment; and an aniline black daylight fluorescent pigment. Examples of the pigment other than these pigments include: C.I. Pigment Black 1, 6, and 7; C.I. Pigment Yellow 1, 2, 3, 12, 13, 14, 15, 16, 17, 55, 78, 150, 151, 154, 180, 185, and 194; C.I. Pigment Orange 31 and 43; C.I. Pigment Red 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C.I. Pigment Violet 196; C.I. Pigment Blue 1, 2, 3, 15, 15:1, 15:2, 15:3, 15:4, 16, 22, and 60; and C.I. Pigment Green 7 and 36. In particular, the pigment that is suitable for the above-mentioned treatment may be carbon black such as "MA8" or "MA100" manufactured by Mitsubishi Chemical Corporation or "Color Black FW200" manufactured by Evonik Degussa GmbH.

An amount of solid content of the phosphate group-modified self-dispersing pigment to be added (an amount of solid content of pigment) with respect to the total amount of the water-base ink is not particularly limited, and may be set suitably depending on a desired optical density or coloration, for example. The amount of solid content of the pigment is, for example, in the range of 0.1 wt % to 20 wt %, 1 wt % to 10 wt %, and 2 wt % to 8 wt %.

The coloring agent may further contain other pigments and dyes besides the phosphate group-modified self-dispersing pigment.

The water may be ion-exchange water or purified water. The amount of the water to be added with respect to the total amount of the water-based ink (the proportion of the water in the water-based ink) is, for example, in the range of 10 wt % to 90 wt %, and 40 wt % to 80 wt %. The proportion of the water in the water-based ink may be a balance of the other components, for example.

Examples of the water-soluble organic solvent include: a humectant that prevents a water-based ink from drying at a nozzle tip portion of an ink-jet head; and a penetrant that adjusts a drying rate of a water-based ink on a recording medium.

The humectant is not particularly limited, and examples thereof include lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketone such as acetone; ketoalcohol such as diacetone alcohol; ethers such as tetrahydrofuran and dioxane; polyalcohols such as polyalkylene glycol, alkylene glycol, glycerin, and trimethylol propane; 2-pyrrolidone; N-methyl-2-pyrrolidone; and 1,3-dimethyl-2-imidazolidinone. Examples of the polyalkylene glycol include polyethylene glycol and polypropylene glycol. Examples of the alkylene glycol include ethylene glycol, propylene glycol, butylene glycol, diethylene glycol, triethylene glycol, dipropylene glycol, tripropylene glycol, thiodiglycol, and hexylene glycol. These humectants may be used alone or in a combination of two or more of them. Out of these, the humectant may be polyalcohol such as alkylene glycol or glycerin.

The amount of the humectant to be added with respect to the total amount of the water-based ink is, for example, in the range of 0 wt % to 95 wt %, 5 wt % to 80 wt %, and 5 wt % to 50 wt %.

Examples of the penetrant include glycol ethers. Examples of the glycol ethers include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. The penetrants may be used alone or in a combination of two or more of them.

The amount of the penetrant to be added with respect to the total amount of the water-based ink is, for example, in the range of 0 wt % to 20 wt %, 0.1 wt % to 15 wt %, and 0.5 wt % to 10 wt %.

As mentioned above, the water-based ink further contains at least one (hereinafter, also referred to as a "specific component") selected from the group consisting of boric acid, diglycolic acid, and a chelating agent. Containing the specific component enables a water-based ink to obtain superior respersibility and high optical density (OD).

Examples of the boric acid include: an oxo acid generated by hydrating boric oxide such as orthoboric acid, metaboric acid, or tetraboric acid; and a salt thereof (including hydrate). Examples of the boric acid include ammonium borate (for example, ammonium tetraborate tetrahydrate and ammonium pentaborate octahydrate); potassium borate (for example, potassium tetraborate tetrahydrate); lithium borate (for example, lithium tetraborate (anhydride) and lithium tetraborate trihydrate); boric acid; sodium borate (for example, disodium tetraborate (anhydride), disodium tetraborate decahydrate, and borax); and barium borate. The boric acid may be at least one of ammonium borate and potassium borate. It is to be noted that the compounds are merely illustrative, and the number of boron atoms, the types and number of anions in borate salt, and the number of water molecules in hydrate are not limited to these. The amount of the boric acid to be added with respect to the total amount of the water-based ink is, for example, in the range of 0.01 wt % to 10 wt %, 0.05 wt % to 3 wt %, and 0.1 wt % to 1 wt %.

The diglycolic acid is not only diglycolic acid but also a compound in which the respective alkylene groups of two alkylene carboxylic acid groups are bonded via O, S, SO, or $SO_2$ or a salt thereof. Examples of the diglycolic acid include diglycolic acid (2,2'-oxydiacetic acid), thiodiglycolic acid (2,2'-thiodiacetic acid), 3,3'-oxydipropionic acid, 3,3'-thiodipropionic acid, 4,4'-oxydibutyric acid, 4,4'-thiodibutyric acid, 5,5'-oxydivaleric acid, 5,5'-thiodivaleric acid, 6,6'-oxybishexanoic acid, 6,6'-thiobishexanoic acid, and salts thereof. The amount of the diglycolic acid to be added with respect to the total amount of the water-based ink is, for example, in the range of 0.01 wt % to 10 wt %, 0.05 wt % to 5 wt %, and 0.1 wt % to 3 wt %.

The chelating agent is not particularly limited and a conventionally known chelating agent may be used. Examples of the chelating agent include ethylenediamine tetraacetic acid, ethylenediamine diacetic acid, nitrilotriacetic acid, 1,3-propanediamine tetraacetic acid, diethylenetriamine pentaacetic acid, N-hydroxyethyl ethylenediamine triacetic acid, iminodiacetic acid, uramildiacetic acid, 1,2-diaminocyclohexane-N,N,N',N'-tetraacetic acid, malonic acid, succinic acid, glutaric acid, maleic acid, and salts thereof (including hydrates). The chelating agent may be at least one selected from the group consisting of ethylenediamine tetraacetic acid, a ethylenediamine tetraacetic acid salt, nitrilotriacetic acid, and a nitrilotriacetic acid salt. The amount of the chelating agent to be added with respect to the total amount of the water-based ink is, for example, in the range of 0.01 wt % to 10 wt %, 0.05 wt % to 5 wt %, and 0.1 wt % to 3 wt %.

The water-based ink may further contain a calcium ion. Containing a calcium ion enables a water-based ink to obtain higher optical density (OD). A method for adding the calcium ion to the water-based ink is not particularly limited, and for example, the calcium ion may be added as a salt composed of the calcium ion and an anion binding to the calcium ion or an aqueous solution thereof. The anion is not particularly limited, and examples thereof include a bromide ion, a chloride ion, a nitrate ion, an acetate ion, a lactate ion, and a sulfate ion. In the case where the specific component is the boric acid or the diglycolic acid, the amount of the calcium ion to be added with respect to the total amount of the water-based ink (a proportion of the calcium ion in the water-based ink) is, for example, in the range of 0 ppm to 500 ppm, 5 ppm to 300 ppm, and 10 ppm to 150 ppm. In the case where the specific component is the chelating agent, the amount is, for example, in the range of 0 ppm to 800 ppm, 5 ppm to 500 ppm, and 10 ppm to 250 ppm.

The water-based ink may further contain a conventionally known additive as required. Examples of the additive include a surfactant, a pH adjuster, a viscosity modifier, a surface tension modifier, and a mildew proofing agent. Examples of the viscosity modifier include polyvinyl alcohol, cellulose, and a water-soluble resin.

The water-based ink may be prepared by uniformly mixing a coloring agent, water, a water-soluble organic solvent, the specific component, a calcium ion that is an optional component, and other components to be added as required by a conventionally known method, and then removing precipitates with a filter, for example.

The ink-jet recording method using the water-based ink may be performed using, for example, the ink-jet recording apparatus. The recording includes recording of letters; images; printing; and the like.

Figure 1:
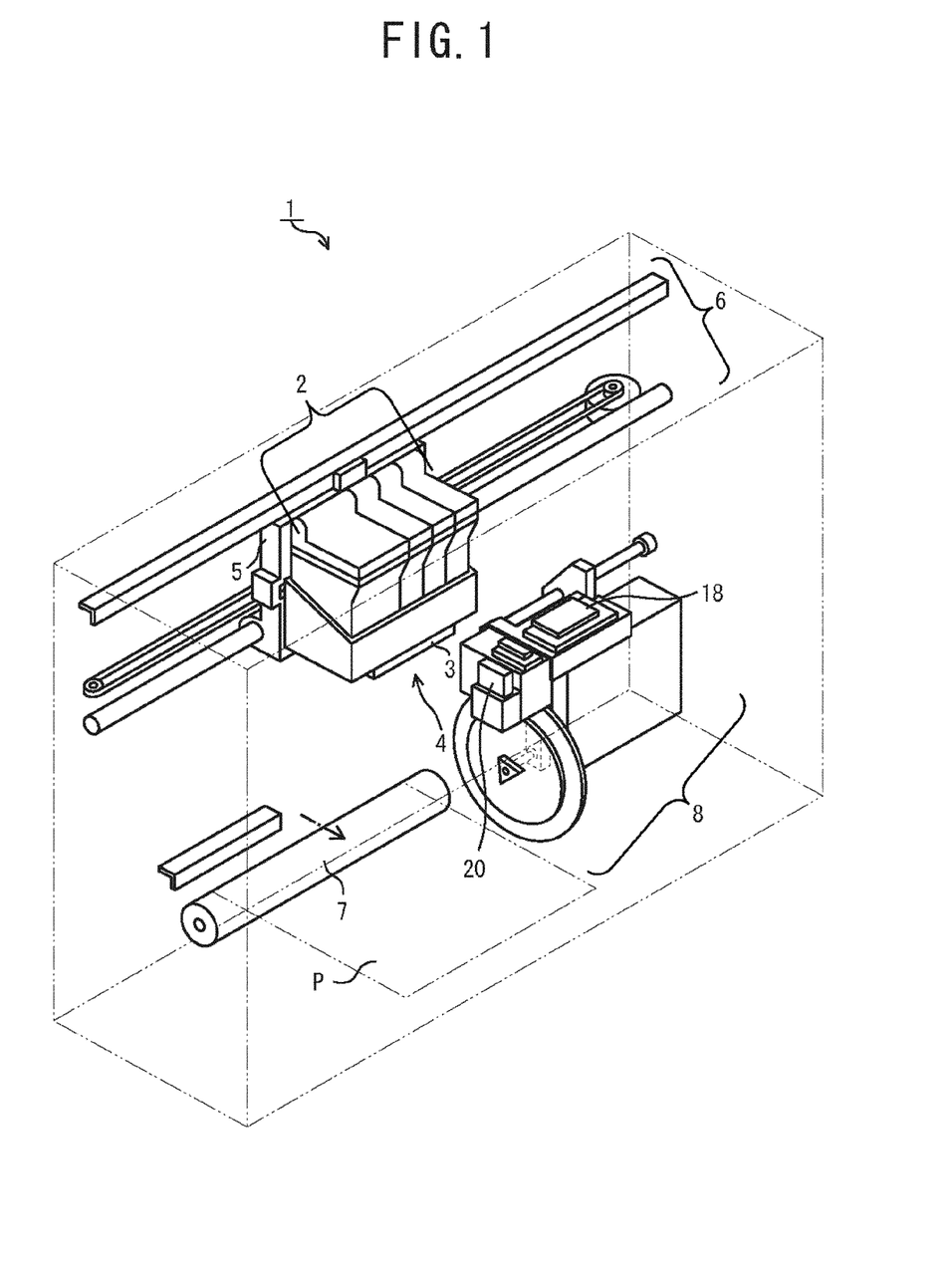
FIG. 1 is a schematic perspective view showing a configuration of an example of the ink-jet recording apparatus.

As shown in FIG. 1, the ink-jet recording apparatus 1 includes, as main components, four ink cartridges 2, an ink ejecting unit (an ink-jet head) 3, a head unit 4, a carriage 5, a drive unit 6, a platen roller 7, and a purge unit 8, for example.

The four ink cartridges 2 contain water-based inks of four colors, namely, yellow, magenta, cyan, and black, respectively. For example, the water-based black ink is the water-based ink for ink jet recording. The ink-jet head 3 arranged in the head unit 4 performs recording on a recording medium (for example, a recording paper) P. The four ink cartridges 2 and the head unit 4 are mounted on the carriage 5. The drive unit 6 reciprocates the carriage 5 in a straight line. As the drive unit 6, a conventionally known drive unit may be used (see JP 2008-246821 A, for example). The platen roller 7 extends in the reciprocating direction of the carriage 5 and is arranged so as to face to the ink-jet head 3.

The recording paper P is fed from a paper feeding cassette (not shown) positioned on a side of or below the ink-jet recording apparatus 1. The recording medium P is introduced between the ink-jet head 3 and the platen roller 7. Then, a predetermined recording is performed on the introduced recording medium P with the water-based ink ejected from the ink-jet head 3. The water-based ink is superior in redispersibility so that poor ejection does not occur even when the water-based ink is heated in the ink-jet head 3. The recorded recording paper P then is discharged from the ink-jet recording apparatus 1. The recorded object is obtained by performing recording using the water-based ink containing the specific component so that an optical density (ID) becomes high. In FIG. 1, a feeding mechanism and a discharging mechanism of the recording medium P are not shown.

The purge unit 8 draws poor inks containing, for example, air bubbles trapped inside the ink-jet head 3. As the purge unit 8, a conventionally known purge unit may be used (see JP 2008-246821 A, for example).

On the platen roller 7 side of the purge unit 8, a wiper member 20 is provided adjacent to the purge unit 8. The wiper member 20 has a spatula shape, and wipes a nozzle-formed surface of the ink-jet head 3 accompanying the movement of the carriage 5. In FIG. 1, a cap 18 covers a plurality of nozzles of the ink-jet head 3, which returns to the reset position after completion of the recording, in order to prevent the inks from drying.

In the ink-jet recording apparatus, the four ink cartridges may be mounted on a plurality of carriages. Alternatively, the four ink cartridges may not be mounted on the carriage, but may be arranged and fixed in the ink-jet recording apparatus. In such an embodiment, for example, the ink cartridges are connected to the head unit mounted on the carriage via a tube or the like, and the inks are supplied to the head unit from the ink cartridges.

In the apparatus shown in FIG. 1, a serial-type ink-jet head is employed, but the ink-jet recording apparatus may be an apparatus in which a line-type ink-jet head is employed.

In the ink-jet recording method, the method for improving redispersibility of the water-based ink for ink jet recording, and the method for improving an optical density of a recorded object, the types, amounts to be added, and forms of various components such as a coloring agent, the specific component, a calcium ion, and the like may be the same as those of the water-based ink for ink jet recording.

EXAMPLES

Next, the examples are explained together with the comparative examples. It is to be noted that the present invention is not limited by the following examples and comparative examples.

Examples 1 to 25 and Comparative Examples 1 to 17

Components shown in the water-based ink composition (Tables 1 and 3) except an aqueous dispersion of a self-dispersing carbon black were uniformly mixed so as to obtain an ink solvent. Then, the ink solvent was added to the aqueous dispersion of the self-dispersing carbon black, and they were mixed uniformly. Thereafter, the mixture thus obtained was filtered with an acetyl cellulose membrane filter (with a pore size of 3.00 μm) manufactured by Toyo Roshi Kaisha, Ltd. Thus, the respective water-based inks for ink jet recording of Examples 1 to 25 and Comparative Examples 1 to 17 were obtained.

With respect to the water-based inks of the examples and the comparative examples, (a) evaluation of redispersibility, (b) measurement of optical density (OD) were conducted by the following methods.

(a) Redispersibility Evaluation

12 μl of each of the water-based inks of the examples and the comparative examples was placed on a slide glass. The slide glass was then stood still overnight at 100° C. so as to evaporate to dryness. Next, three drops of water were dropped on the solid substance obtained after the evaporation to dryness using a dropper. The evaluation sample thus produced was observed by the naked eye and a microscope with a 50-fold magnification, and redispersibility of the water-based ink was evaluated by visual check according to the following evaluation criteria.

Evaluation Criteria of Redispersibility Evaluation

Figure 2:
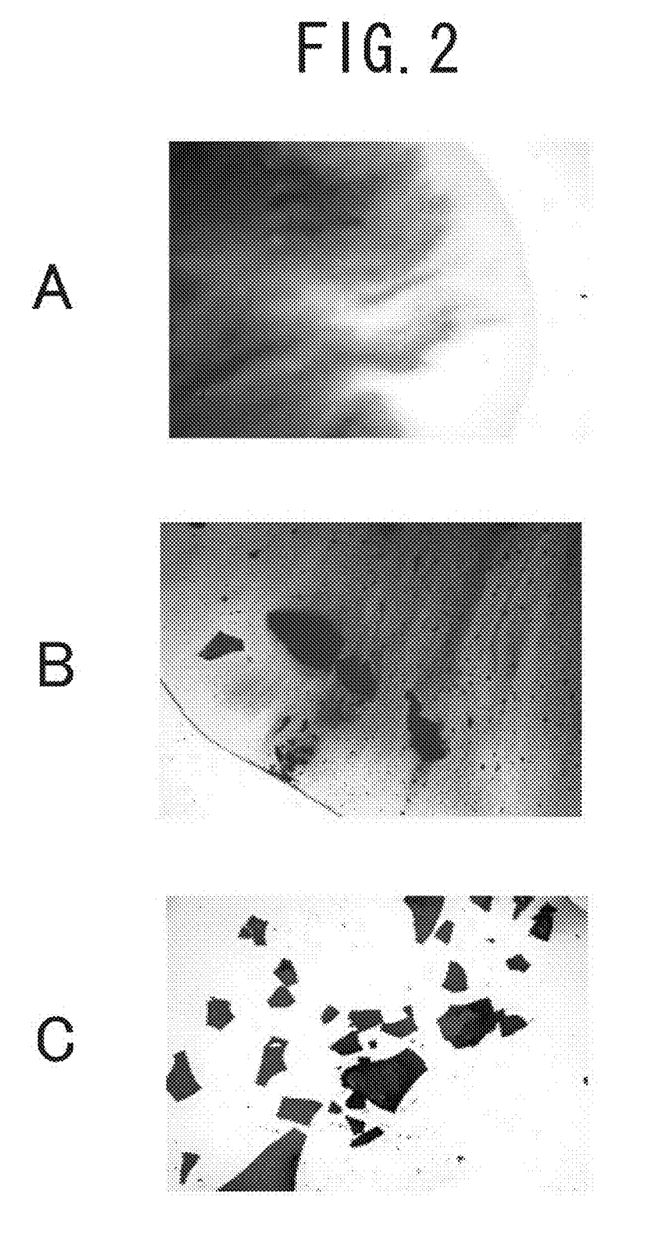
FIGS. 2A to 2C are illustrations showing evaluation criteria of redispersibility in the examples.

A: As shown in FIG. 2A, it was observed even by a microscope that the solid substance was completely dissolved or dispersed in water.

B+: The solid substance was observed as if it was completely dissolved or dispersed in water by the naked eye, while the remains that were not dissolved or dispersed in water were observed by a microscope.

B: The solid substance was gradually dissolved or dispersed in water, while the remains that were not dissolved or dispersed in water were observed even by the naked eye, and was observed as shown in FIG. 2B by a microscope.

B−: The solid substance was dissolved or dispersed to an extent that water is slightly colored, but lumps of the solid substance were also observed as they were.

C: As shown in FIG. 2C, the solid substance was not at all dissolved or dispersed in water, and lumps of the solid substance that were remained as they are were observed by a microscope.

(b) Optical Density (OD) Measurement

An image including a single patch of black was recorded on plain papers with each of the water-based inks of the examples and the comparative examples using a digital multifunction center DCP-385C mounted an ink-jet printer manufactured by Brother Industries, Ltd at a resolution of 600 dpi×600 dpi. Thus, evaluation samples were produced. Optical densities (OD) of each of the evaluation samples were measured by a spectrocolorimeter, SpectroEye (light source: $D_{50}$, concentration standard: ANSI T, White base: Abs, internal filter: No), manufactured by X-Rite Incorporated. As the plain papers, Laser Print (plain paper 1) manufactured by Hammer Mill, and Business (plain paper 2) and Recycled Supreme (plain paper 3) manufactured by XEROX Corporation were used. The measurement of the optical density (OD) was conducted five times with respect to each plain paper.

The ink composition and evaluation results of the respective water-based inks of the examples were summarized in Tables 1 and 2. The ink composition and the evaluation results of the respective water-based inks of the comparative examples were summarized in Tables 3 and 4. In Tables 2 and 4, the measurement result of optical density (OD) of each of the plain papers is an average value of the results of five-time measurements, and "average of three papers" (the bottom in the tables) means an average value of measurement results of three papers, obtained by dividing the sum of the average values (of five-time measurements) of the plane papers 1 to 3 by 3.

TABLE 1

| | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Ink composition (wt %) | Aqueous dispersion of phosphate group-modified self-dispersing carbon black (*1) | 4.0 | 4.0 | 4.0 | 4.0 | 4.0 | 4.0 | 4.0 | 4.0 | 4.0 | 4.0 | 4.0 | 4.0 |
| | Glycerin | 10.0 | 10.0 | 10.0 | — | 10.0 | 10.0 | 10.0 | — | 10.0 | 10.0 | 10.0 | — |
| | Trimethylol propane | 5.0 | 5.0 | 5.0 | — | 5.0 | 5.0 | 5.0 | — | 5.0 | 5.0 | 5.0 | — |
| | Diethylene glycol | — | — | — | 10.0 | — | — | — | 10.0 | — | — | — | 10.0 |
| | 2-pyrrolidone | — | — | — | 5.0 | — | — | — | 5.0 | — | — | — | 5.0 |
| | Acethylenol ® E40 (*4) | — | — | — | 0.15 | — | — | — | 0.15 | — | — | — | 0.15 |
| | Acethylenol ® E100 (*5) | 0.3 | 0.3 | 0.3 | — | 0.3 | 0.3 | 0.3 | — | 0.3 | 0.3 | 0.3 | — |
| | Ammonium tetraborate tetrahydrate | 0.2 | 0.1 | — | 0.5 | 0.2 | 0.1 | — | 0.5 | — | — | — | — |
| | Potassium tetraborate tetrahydrate | — | — | 1.0 | — | — | — | 1.0 | — | — | — | — | — |
| | Diglycolic acid | — | — | — | — | — | — | — | — | — | 0.2 | 0.1 | — | 0.5 |
| | Thiodiglycolic acid | — | — | — | — | — | — | — | — | — | — | 3.0 | — |
| | Ethylenediamine tetraacetic acid disodium | — | — | — | — | — | — | — | — | — | — | — | — |
| | Nitrilotriacetic acid trisodium monohydrate | — | — | — | — | — | — | — | — | — | — | — | — |
| | 5.89 wt % calcium nitrate tetrahydrate solution | — | — | — | — | 1.5 | 1.0 | 0.1 | 0.1 | — | — | — | — |
| | Water | Balance | Balance | Balance | Balance | Balance | Balance | Balance | Balance | Balance | Balance | Balance | Balance |
| Proportion of calcium ion (ppm) | | 0 | 0 | 0 | 0 | 150 | 100 | 10 | 10 | 0 | 0 | 0 | 0 |

| | | Examples | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 | 25 |
| Ink composition (wt %) | Aqueous dispersion of phosphate group-modified self-dispersing carbon black (*1) | 4.0 | 4.0 | 4.0 | 4.0 | 4.0 | 4.0 | 4.0 | 4.0 | 4.0 | 4.0 | 4.0 | 4.0 | 4.0 |
| | Glycerin | 10.0 | 10.0 | 10.0 | — | 10.0 | 10.0 | 10.0 | — | 10.0 | 10.0 | 10.0 | — | 10.0 |
| | Trimethylol propane | 5.0 | 5.0 | 5.0 | — | 5.0 | 5.0 | 5.0 | — | 5.0 | 5.0 | 5.0 | — | 5.0 |
| | Diethylene glycol | — | — | — | 10.0 | — | — | — | 10.0 | — | — | — | 10.0 | — |
| | 2-pyrrolidone | — | — | — | 5.0 | — | — | — | 5.0 | — | — | — | 5.0 | — |
| | Acethylenol ® E40 (*4) | — | — | — | 0.15 | — | — | — | 0.15 | — | — | — | 0.15 | — |
| | Acethylenol ® E100 (*5) | 0.3 | 0.3 | 0.3 | — | 0.3 | 0.3 | 0.3 | — | 0.3 | 0.3 | 0.3 | — | 0.3 |
| | Ammonium tetraborate tetrahydrate | — | — | — | — | — | — | — | — | — | — | — | — | — |

TABLE 1-continued

|  | | | | | | | | | | | | | |
|---|---|---|---|---|---|---|---|---|---|---|---|---|---|
| Potassium tetraborate tetrahydrate | — | — | — | — | — | — | — | — | — | — | — | — | — |
| Diglycolic acid | 0.2 | 0.1 | — | 0.5 | — | — | — | — | — | — | — | — | — |
| Thiodiglycolic acid | — | — | 3.0 | — | — | — | — | — | — | — | — | — | — |
| Ethylenediamine tetraacetic acid disodium | — | — | — | — | 0.2 | 0.1 | — | 1.0 | 0.2 | 0.2 | 0.1 | 1.0 | — |
| Nitrilotriacetic acid trisodium monohydrate | — | — | — | — | — | — | 3.0 | — | — | — | — | — | 0.2 |
| 5.89 wt % calcium nitrate tetrahydrate solution | 1.0 | 1.5 | 0.1 | 0.1 | — | — | — | — | 1.5 | 2.5 | 1.5 | 0.1 | 0.1 |
| Water | Balance | Balance | Balance | Balance | Balance | Balance | Balance | Balance | Balance | Balance | Balance | Balance | Balance |
| Proportion of calcium ion (ppm) | 100 | 150 | 10 | 10 | 0 | 0 | 0 | 0 | 150 | 250 | 150 | 10 | 10 |

TABLE 2

| | | Examples | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Evaluation | Redispersibility | B+ | B+ | A | B | B | B | A | B− | B− | B− | B− | B− | B− |
| | Optical density (OD) | | | | | | | | | | | | | |
| | plain paper 1 (*6) | 1.35 | 1.30 | 1.40 | 1.38 | 1.45 | 1.44 | 1.45 | 1.41 | 1.50 | 1.34 | 1.54 | 1.51 | 1.51 |
| | plain paper 2 (*7) | 1.29 | 1.27 | 1.35 | 1.31 | 1.41 | 1.35 | 1.41 | 1.32 | 1.43 | 1.31 | 1.51 | 1.48 | 1.45 |
| | plain paper 3 (*8) | 1.38 | 1.33 | 1.41 | 1.44 | 1.48 | 1.41 | 1.45 | 1.51 | 1.43 | 1.30 | 1.50 | 1.49 | 1.45 |
| | Average of three plain papers | 1.34 | 1.30 | 1.39 | 1.38 | 1.45 | 1.40 | 1.44 | 1.41 | 1.45 | 1.32 | 1.52 | 1.49 | 1.47 |

| | | Examples | | | | | | | | | | | |
|---|---|---|---|---|---|---|---|---|---|---|---|---|---|
| | | 14 | 15 | 16 | 17 | 18 | 19 | 20 | 21 | 22 | 23 | 24 | 25 |
| Evaluation | Redispersibility | B− | B− | B− | A | A | B | B− | A | B+ | B+ | B− | B |
| | Optical density (OD) | | | | | | | | | | | | |
| | plain paper 1 (*6) | 1.47 | 1.56 | 1.54 | 1.32 | 1.31 | 1.37 | 1.34 | 1.43 | 1.45 | 1.43 | 1.35 | 1.32 |
| | plain paper 2 (*7) | 1.40 | 1.52 | 1.51 | 1.28 | 1.26 | 1.37 | 1.31 | 1.37 | 1.43 | 1.34 | 1.35 | 1.30 |
| | plain paper 3 (*8) | 1.43 | 1.51 | 1.51 | 1.35 | 1.35 | 1.40 | 1.43 | 1.47 | 1.47 | 1.50 | 1.45 | 1.30 |
| | Average of three plain papers | 1.43 | 1.53 | 1.52 | 1.32 | 1.31 | 1.38 | 1.36 | 1.42 | 1.45 | 1.42 | 1.38 | 1.31 |

TABLE 3

| | | Comparative Examples | | | | | | | | |
|---|---|---|---|---|---|---|---|---|---|---|
| | | 1 | 2 | 3 | 4 | 5 | 6 | 7 | 8 | 9 |
| Ink composition (wt %) | Aqueous dispersion of phosphate group-modified self-dispersing carbon black (*1) | 4.0 | 4.0 | 4.0 | 4.0 | 4.0 | 4.0 | — | — | — |
| | CAB-O-JET ® 300 (*2) | — | — | — | — | — | — | 26.7 (4.0) | 26.7 (4.0) | 26.7 (4.0) |
| | CAB-O-JET ® 200 (*3) | — | — | — | — | — | — | — | — | — |
| | Glycerin | 10.0 | — | 10.0 | 10.0 | 10.0 | 10.0 | 10.0 | 10.0 | 10.0 |
| | Trimethylol propane | 5.0 | — | 5.0 | 5.0 | 5.0 | 5.0 | 5.0 | 5.0 | 5.0 |
| | Diethylene glycol | — | 10.0 | — | — | — | — | — | — | — |
| | 2-pyrrolidone | — | 5.0 | — | — | — | — | — | — | — |
| | Acetylenol ® E40 (*4) | — | 0.15 | — | — | — | — | — | — | — |
| | Acetylenol ® E100 (*5) | 0.3 | — | 0.3 | 0.3 | 0.3 | 0.3 | 0.3 | 0.3 | 0.3 |
| | Ammonium tetraborate tetrahydrate | — | — | — | — | — | — | — | 0.2 | — |
| | Diglycolic acid | — | — | — | — | — | — | — | — | — |
| | Ethylenediamine tetraacetic acid disodium | — | — | — | — | — | — | — | — | — |

TABLE 3-continued

|  | | | | | | | | | |
|---|---|---|---|---|---|---|---|---|---|
| 5.89 wt % calcium nitrate tetrahydrate solution | — | — | 0.1 | 0.5 | 1.0 | 1.5 | — | — | 1.5 |
| Water | balance | balance | balance | balance | balance | balance | balance | balance | balance |
| Proportion of calcium ion (ppm) | 0 | 0 | 10 | 50 | 100 | 150 | 0 | 0 | 150 |

| | | Comparative Examples | | | | | | | |
|---|---|---|---|---|---|---|---|---|---|
| | | 10 | 11 | 12 | 13 | 14 | 15 | 16 | 17 |
| Ink composition (wt %) | Aqueous dispersion of phosphate group-modified self-dispersing carbon black (*1) | — | — | — | — | — | 4.0 | — | — |
| | CAB-O-JET ® 300 (*2) | — | — | — | 26.7 (4.0) | — | — | 26.7 (4.0) | — |
| | CAB-O-JET ® 200 (*3) | 20.0 (4.0) | 20.0 (4.0) | 20.0 (4.0) | — | 20.0 (4.0) | — | — | 20.0 (4.0) |
| | Glycerin | 10.0 | 10.0 | 10.0 | 10.0 | 10.0 | 10.0 | 10.0 | 10.0 |
| | Trimethylol propane | 5.0 | 5.0 | 5.0 | 5.0 | 5.0 | 5.0 | 5.0 | 5.0 |
| | Diethylene glycol | — | — | — | — | — | — | — | — |
| | 2-pyrrolidone | — | — | — | — | — | — | — | — |
| | Acethylenol ® E40 (*4) | — | — | — | — | — | — | — | — |
| | Acethylenol ® E100 (*5) | 0.3 | 0.3 | 0.3 | 0.3 | 0.3 | 0.3 | 0.3 | 0.3 |
| | Ammonium tetraborate tetrahydrate | — | 0.2 | — | — | — | — | — | — |
| | Diglycolic acid | — | — | — | 0.2 | 0.2 | — | — | — |
| | Ethylenediamine tetraacetic acid disodium | — | — | — | — | — | — | 0.2 | 0.2 |
| | 5.89 wt % calcium nitrate tetrahydrate solution | — | — | 1.5 | — | — | 2.5 | — | — |
| | Water | balance | balance | balance | balance | balance | balance | balance | balance |
| | Proportion of calcium ion (ppm) | 0 | 0 | 150 | 0 | 0 | 250 | 0 | 0 |

TABLE 4

| | | Comparative Examples | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| Evaluation | Redispersibility | C | C | C | C | C | C | B | B | B | A | A | A | agglutination | A | agglutination | B | A |
| | Optical density (OD) plain paper 1 (*6) | 1.28 | 1.38 | 1.31 | 1.36 | 1.38 | 1.44 | 1.05 | 1.08 | 1.15 | 0.99 | 1.01 | 1.03 | | 1.07 | | 1.12 | 1.00 |
| | plain paper 2 (*7) | 1.27 | 1.29 | 1.28 | 1.30 | 1.32 | 1.39 | 1.12 | 1.13 | 1.13 | 1.06 | 1.06 | 1.07 | | 1.10 | | 1.10 | 1.07 |
| | plain paper 3 (*8) | 1.25 | 1.42 | 1.31 | 1.33 | 1.36 | 1.47 | 1.09 | 1.18 | 1.27 | 0.97 | 1.02 | 1.03 | | 1.06 | | 1.29 | 1.00 |
| | Average of three plain papers | 1.27 | 1.36 | 1.30 | 1.33 | 1.35 | 1.43 | 1.09 | 1.13 | 1.18 | 1.01 | 1.03 | 1.04 | | 1.08 | | 1.17 | 1.02 |

As summarized in Tables 1 to 4, water-based inks of Examples 1 to 3, 9 to 11, and 17 to 19, each containing the specific component, were superior in redispersibility and had high optical densities (OD) as compared with a water-based ink of Comparative Example 1, having the same composition as those of Examples 1 to 3, 9 to 11, and 17 to 19 except containing no specific component. Similarly, water-based inks of Examples 4, 12, and 20, each containing the specific component, were superior in redispersibility and had high optical densities (OD) as compared with a water-based ink of Comparative Example 2, having the same composition as those of Examples 4, 12, and 20 except containing no specific component. In particular, the water-based ink of Example 3 in the case where the amount of boric acid to be added was 1.0 wt % had significant effects in improvements of redispersibility and optical density.

A water-based ink of Example 5, containing a calcium ion besides boric acid, had high optical densities (OD) as compared with the water-based inks of Examples 1 to 4, each containing no calcium ion. The water-based ink of Example 5 was superior in redispersibility and had high optical densities (OD) as compared with a water-based ink of Comparative Example 6, having the same composition as that of Example 5 except containing no boric acid. Similarly, a water-based ink of Example 6, containing a calcium ion besides boric acid, had high optical densities (OD) as compared with the water-based inks of Examples 1 to 4, containing no calcium ion. The water-based ink of Example 6 was superior in redispersibility and had high optical densities (OD) as compared with a water-based ink of Comparative Example 5, having the same composition as that of Example 6 except containing no boric acid. Similarly, a water-based ink of Example 7, containing a calcium ion besides boric acid, had high optical densities (OD) as compared with the water-based inks of Examples 1 to 4, containing no calcium ion. The water-based ink of Example 7 was superior in redispersibility and had high optical densities (OD) as compared with a water-based ink of Comparative Example 3, having the same composition as that of Example 7 except containing no boric acid. The water-based ink of Example 7 in the case where the amount of boric acid to be added was 1.0 wt % had significant effects in improvements of redispersibility and optical density even though the proportion of the calcium ion in the water-based ink was 10 ppm that was low. A water-based ink of Example 8, containing a calcium ion besides boric acid, had high optical densities (OD) as compared with the water-based inks of Examples 1 to 4, containing no calcium ion. It is considered from the results of Comparative Examples 3 to 6 that in the case of containing no boric acid, the higher the proportion of the calcium ion, the higher the optical density (OD).

A water-based ink of Example 13, containing a calcium ion besides diglycolic acid, had high optical densities (OD) as compared with the water-based ink of Example 9, having the same composition as that of Example 13 except containing no calcium ion. The water-based ink of Example 13 was superior in redispersibility and had high optical densities (OD) as compared with a water-based ink of Comparative Example 5, having the same composition as that of Example 13 except containing no diglycolic acid. A water-based ink of Example 14, containing a calcium ion besides diglycolic acid, had high optical densities (OD) as compared with the water-based ink of Example 10, having the same composition as that of Example 14 except containing no calcium ion. The water-based ink of Example 14 was superior in redispersibility as compared with the water-based ink of Comparative Example 6, having the same composition as that of Example 14 except containing no diglycolic acid. A water-based ink of Example 15, containing a calcium ion besides diglycolic acid, had high optical densities (OD) as compared with the water-based ink of Example 11, having the same composition as that of Example 15 except containing no calcium ion. The water-based ink of Example 15 was superior in redispersibility and had high optical densities (OD) as compared with the water-based ink of Comparative Example 3, having the same composition as that of Example 15 except containing no diglycolic acid. A water-based ink of Example 16, containing a calcium ion besides diglycolic acid, had high optical densities (OD) as compared with the water-based ink of Example 12, having the same composition as that of Example 16 except containing no calcium ion.

Water-based inks of Examples 21 and 23, each containing a calcium ion besides a chelating agent, had high optical densities (OD) as compared with the water-based inks of Examples 17 to 20, containing no calcium ion. The water-based inks of Examples 21 and 23 were superior in redispersibility as compared with the water-based ink of Comparative Example 6, having the same composition as those of Examples 21 and 23 except containing no chelating agent. A water-based ink of Example 22, containing a calcium ion besides a chelating agent, had high optical densities (OD) as compared with the water-based inks of Examples 17 to 20, containing no calcium ion. In a water-based ink of Comparative Example 15, having the same composition as that of Example 22 except containing no chelating agent, aggregation occurred, and a redispersibility evaluation and a measurement of optical density (OD) could not be conducted. As described above, in the case of Example 22, the occurrence of aggregation in the water-based ink was avoided by adding a chelating agent even though the proportion of the calcium ion in the water-based ink was 250 ppm that was high. A water-based ink of Example 24, containing a calcium ion besides a chelating agent, had high optical densities (OD) as compared with the water-based ink of Example 20, having the same composition as that of Example 24 except having no calcium ion. The water-based ink of Example 25, containing a calcium ion besides a chelating agent, was superior in redispersibility and had high optical densities (OD) as compared with the water-based ink of Comparative Example 3, having the same composition as that of Example 25 except containing no chelating agent.

As compared with the water-based inks of the examples, water-based inks of Comparative Examples 7 to 9 and 16, using a carboxylic group-modified self-dispersing carbon black as substitute for a phosphate group-modified self-dispersing carbon black and water-based inks of Comparative Examples 10 to 12, 14, and 17, using a sulfonate group-modified self-dispersing carbon black as substitute for the same had significantly low optical densities (OD). In a water-based ink of Comparative Example 13, using a carboxylic group-modified self-dispersing carbon black as substitute for a phosphate group-modified self-dispersing carbon black, when diglycolic acid was added to the water-based ink, aggregation occurred, and a redispersibility evaluation and a measurement of optical density (OD) could not be conducted.

It will be obvious to those having skill in the art that many changes may be made in the above-described details of the particular aspects described herein without departing from the spirit or scope of the invention as defined in the appended claims.

What is claimed is:
1. A water-based ink for ink jet recording, comprising:
   a coloring agent; water; and
   a water-soluble organic solvent,
wherein the coloring agent comprises a phosphate group-modified self-dispersing pigment, and
   the water-based ink further comprises a calcium ion and at least one selected from the group consisting of boric acid or a salt thereof, diglycolic acid or a derivative thereof, and a chelating agent; wherein at least one of the following Conditions 1 to 3 is satisfied:
Condition 1
   0.05 wt % to 3 wt % of boric acid or a salt thereof is contained in the total amount of the water-based ink, and the amount of the calcium ion with respect to the total amount of the water-based ink is in the range of 5 ppm to 300 ppm;
Condition 2
   0.05 wt % to 5 wt % of diglycolic acid or a derivative thereof is contained in the total amount of the water-based ink, and the amount of the calcium ion with respect to the total amount of the water-based ink is in the range from 5 ppm to 300 ppm;
Condition 3
   0.05 wt % to 5 wt % of the chelating agent is contained in the total amount of the water-based ink, and the amount of the calcium ion with respect to the total amount of the water-based ink is in the range from 5 ppm to 500 ppm.

2. The water-based ink for ink jet recording according to claim 1, wherein the phosphate group-modified self-dispersing pigment is self-dispersing carbon black.

3. The water-based ink for ink jet recording according to claim 1, wherein the boric acid salt is at least one of ammonium borate and potassium borate.

4. The water-based ink for ink jet recording according to claim 1, wherein the chelating agent is at least one selected from the group consisting of ethylenediamine tetraacetic acid, a ethylenediamine tetraacetic acid salt, nitrilotriacetic acid, and a nitrilotriacetic acid salt.

5. The water-based ink for ink jet recording according to claim 1, wherein the boric acid salt is at least one of ammonium tetraborate tetrahydrate and potassium tetraborate tetrahydrate.

6. The water-based ink for ink jet recording according to claim 1, wherein the diglycolic acid or derivative thereof is at least one of diglycolic acid and thioglycollic acid.

7. The water-based ink for ink jet recording according to claim 1, wherein the chelating agent is at least one of disodium ethylenediamine tetraacetate and nitrilotriacetic acid trisodium salt.

8. The water-based ink for ink jet recording according to claim 1, wherein at least one of the following Conditions 1' to 3' is satisfied:
Condition 1'
   0.1 wt % to 1 wt % of boric acid or a salt thereof is contained in the total amount of the water-based ink, and the amount of the calcium ion with respect to the total amount of the water-based ink is in the range of 10 ppm to 150 ppm;
Condition 2'
   0.1 wt % to 3 wt % of diglycolic acid or a derivative thereof is contained in the total amount of the water-based ink, and the amount of the calcium ion with respect to the total amount of the water-based ink is in the range from 10 ppm to 150 ppm;
Condition 3'
   0.1 wt % to 3 wt % of the chelating agent is contained in the total amount of the water-based ink, and the amount of the calcium ion with respect to the total amount of the water-based ink is in the range of 10 ppm to 250 ppm.

9. The water-based ink for ink jet recording according to claim 1, wherein the amount of the calcium ion with respect to the total amount of the water-based ink is in the range of 100 ppm to 150 ppm.

10. The water-based ink for ink jet recording according to claim 1, wherein the calcium ion is derived from calcium nitrate.

11. An ink cartridge comprising a water-based ink for ink jet recording, wherein the water-based ink is the water-based ink for ink jet recording according to claim 1.

12. An ink jet recording method, comprising:
performing recording on a recording medium by ejecting a water-based ink for ink jet recording,
wherein as the water-based ink, the water-based ink for ink jet recoding according to claim 1 is used.

13. An ink jet recording apparatus, comprising:
an ink storing portion; and
an ink ejection unit, the ink ejection unit ejecting an ink stored in the ink storing portion,
wherein the water-based ink for ink jet recording according to claim 1 is stored in the ink storing portion.

14. A method for improving redispersibility of a water-based ink for ink jet recording that comprises a phosphate group-modified self-dispersing pigment, comprising:
adding a calcium ion and at least one selected from the group consisting of boric acid or a salt thereof, diglycolic acid or a derivative thereof, and a chelating agent to the water-based ink; wherein at least one of the following Conditions 1 to 3 is satisfied:
Condition 1
   0.05 wt % to 3 wt % of boric acid or a salt thereof is contained in the total amount of the water-based ink, and the amount of the calcium ion with respect to the total amount of the water-based ink is in the range of 5 ppm to 300 ppm;
Condition 2
   0.05 wt % to 5 wt % of diglycolic acid or a derivative thereof is contained in the total amount of the water-based ink, and the amount of the calcium ion with respect to the total amount of the water-based ink is in the range from 5 ppm to 300 ppm;
Condition 3
   0.05 wt % to 5 wt % of the chelating agent is contained in the total amount of the water-based ink, and the amount of the calcium ion with respect to the total amount of the water-based ink is in the range from 5 ppm to 500 ppm.

15. A method for improving an optical density of a recorded object obtained by performing recording using a water-based ink for ink jet recording that comprises a phosphate group-modified self-dispersing pigment, comprising:
adding a calcium ion and at least one selected from the group consisting of boric acid or a salt thereof, diglycolic acid or a derivative thereof, and a chelating agent to the water-based ink; wherein at least one of the following Conditions 1 to 3 is satisfied:
Condition 1
   0.05 wt % to 3 wt % of boric acid or a salt thereof is contained in the total amount of the water-based ink, and the amount of the calcium ion with respect to the total amount of the water-based ink is in the range of 5 ppm to 300 ppm;
Condition 2
   0.05 wt % to 5 wt % of diglycolic acid or a derivative thereof is contained in the total amount of the water-based ink, and the amount of the calcium ion with respect to the total amount of the water-based ink is in the range from 5 ppm to 300 ppm;
Condition 3
   0.05 wt % to 5 wt % of the chelating agent is contained in the total amount of the water-based ink, and the amount of the calcium ion with respect to the total amount of the water-based ink is in the range from 5 ppm to 500 ppm.

* * * * *